Dec. 13, 1932.    R. S. TROTT    1,890,871
AUTOMOTIVE VEHICLE
Filed Nov. 24, 1928    3 Sheets-Sheet 1

INVENTOR.
Rolland S. Trott

Dec. 13, 1932.  R. S. TROTT  1,890,871
AUTOMOTIVE VEHICLE
Filed Nov. 24, 1928   3 Sheets-Sheet 2

INVENTOR.
Rolland S. Trott

Dec. 13, 1932.   R. S. TROTT   1,890,871
AUTOMOTIVE VEHICLE
Filed Nov. 24, 1928   3 Sheets-Sheet 3

INVENTOR.
Rolland S. Trott

Patented Dec. 13, 1932

1,890,871

UNITED STATES PATENT OFFICE

ROLLAND S. TROTT, OF DENVER, COLORADO

AUTOMOTIVE VEHICLE

Application filed November 24, 1928. Serial No. 321,634.

My invention relates to engine or power plant mountings for automotive vehicles.

The object of my invention is to minimize the transmission of engine tremor to the vehicle and particularly to the frame or body thereof, by supporting the engine unit in the vehicle for a substantial amount of confined free movement of one end portion of the unit relative to the movement of the other end portion as well as relative to the vehicle, which support is of such a nature as to permit and utilize engine actuated impulses to move the unit and during such movement to cause the engine tremor which would otherwise be transmitted to the vehicle to be substantially dissipated.

The normal operation of the engine unit tends to oscillate the engine unit on its longitudinal axis in response to the impulses incident to the operation of the engine. My mounting permits the engine unit to oscillate on said axis but at the same time it allows the axis of oscillation to move relative to the vehicle or the frame and likewise move the engine unit; but the movement of the back end portion of the engine unit is restricted and is relatively less than at the front end portion of the engine unit, whereby the movement of the axis of oscillation in a path approximating an orbit will develop a path something like a frustrum of a cone with the larger end thereof at the front of the engine or at the end opposite the end having the fly wheel or transmission. Said axis of oscillation at such front end moves in a plane transverse to the length of the engine unit and through a path which may be elliptical, circular, the shape of a figure 8, or other path in the nature of an orbit, but while moving through said path, the engine unit is also oscillating on its axis of oscillation, and to permit such restrained yielding control of the movement which has been termed "orbital", at least at the front end portion of the engine unit, the mounting therefor should be capable of allowing the engine unit to move up and down and laterally from side to side and horizontally, which gives a capability of movement in response to the impulses incident to the operation of the engine unit of a universal nature in any direction for a limited extent in a vertical plane transverse to the longitudinal axis of oscillation about which the engine moves. This restrained freedom of movement of the engine unit in the nature of an orbit while the engine unit turns on its axis of oscillation causes the engine tremor to be substantially dissipated thereby materially minimizing transmission of engine tremor to the vehicle or the body thereof.

It is another object of this invention to provide a power plant mounting for an automotive vehicle, which with fine or especially constructed engines will eliminate all engine sensation and body rumble, and which will decrease the gear noises in low and intermediate gears.

A further object is to provide a power plant mounting which may easily be adapted to most automotive vehicles without extensive re-designing.

A further object is to provide such a power plant mounting in which the power plant is partly supported on the frame in a manner that can transmit no torque to the frame.

A further object is to provide such a power plant mounting in which the power plant is connected to the axle in such a manner as to transmit all torque re-action from the power plant to the axle directly and without said re-action passing to the axle through the body or through the frame upon which the body is mounted.

I accomplish the above objects by a construction which is based upon the following considerations;—

In the present state of the art of manufacturing internal combustion engines, practically all well made engines except some four cylinder engines, are quite well balanced mechanically; that is, the mechanical balance is such that the mere movement of the parts of the engine produces comparatively little if any engine sensation in the vehicle, as may be easily determined by coasting down a hill at high speed with the engine in gear but with the spark off.

But, since there is no such thing as power, explosive or torque balance in internal combustion engines, the explosions, when the engine is pulling, do produce an effect or engine sensation in the vehicle.

This may be called the explosive, power, or torque effect, and its result can be noted in any present day automotive vehicle, regardless of the number of cylinders, by placing the finger tips on the body when the engine is pulling, especially at slow speed in high gear.

Sensation can be found by this finger tip test in most vehicles, in fact, when the engines are accelerated slightly when running idle.

The engine power acts to turn the propeller shaft of the vehicle, and the re-action to this power which turns the shaft, tends to turn the engine in the opposite direction, and since in the conventional construction the engine is mounted on the frame, the frame and body receive the full effect of this power re-action.

The result of this re-action is a tendency to revolve the engine about its crankshaft as a center of rotation; and this tendency, transmitted to the frame, produces the engine sensation mentioned.

I may attain the objects sought in this invention by providing;—

1st, a spring connection extending directly between the engine and the front axle, which spring connection carries some of the weight of the engine and transmits the torque to the axle from the engine, and is adapted to form a torsional cushion to resiliently maintain the position of the engine against the torque reaction; and 2nd, pivotal mounting means between the frame and the engine adapted to freely permit the torsional cushioning movement of the engine, the pivotal mounting means being preferably concentric with the crankshaft of the engine, and adapted to carry part of the weight of the engine.

This construction is fully explained below and shown in the drawings, in which;—

It will be seen that most of the drawings contain exaggerations in part, for the sake of clearness.

Figure 1:
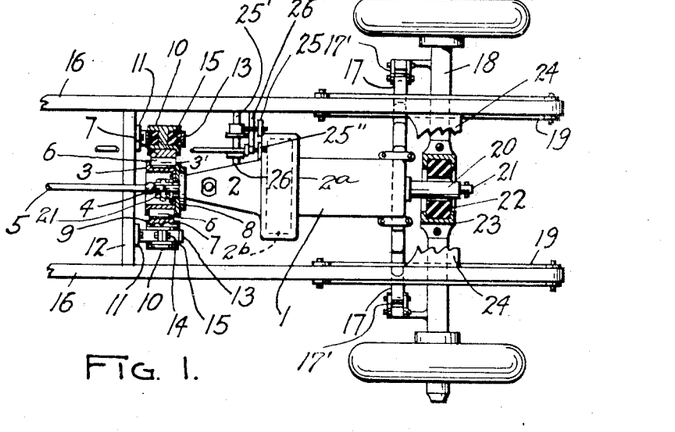
Figure 1 is a fragmentary plan view and partial section of a unit power plant construction, with open propeller shaft, semi-elliptic front springs, and a roller bearing mounted in rubber for the support of the rear of the power plant.

In Figure 1, the engine 1 has the transmission 2 fixed thereto, forming a unit power plant, the parts of which are fixed together for unitary movement with a housing 2a between the engine 1 and transmission 2 and enclosing the usual engine fly wheel 2b.

To the rear end of the power plant is attached the mounting bracket 3, surrounding and concentric with the universal joint 4, connecting the engine crankshaft 21 to the propeller shaft 5. Between the mounting bracket 3 and the transmission 2 is clamped the plate 3'.

The bracket 3 forms the inner track of a roller bearing having rollers 6 and outer track 7. The plate 3' acts to retain the rollers 6.

The flanged support ring 9, provided with the flanged support pins 10, receives the outer track 7, but may be made integral therewith if desired.

The frame brackets 11, properly attached to the frame cross member 12, are each provided with a cap 13, secured thereto by the bolts 14, and thereby forming an apertured end for the bracket.

The flanged support pins 10 are surrounded by the cushion members 15, composed of proper cushioning material such as rubber, and supported in the frame brackets 11.

It will be seen that this method of mounting the rear end of the power plant, permits torsional action of the power plant with respect to the frame, and because of the free movement provided by the roller bearing mounting, the torsional movement of the power plant can impart no vibration to the frame 16 that is due to torque re-action.

Figures 6, 8, 9, 10, 12:
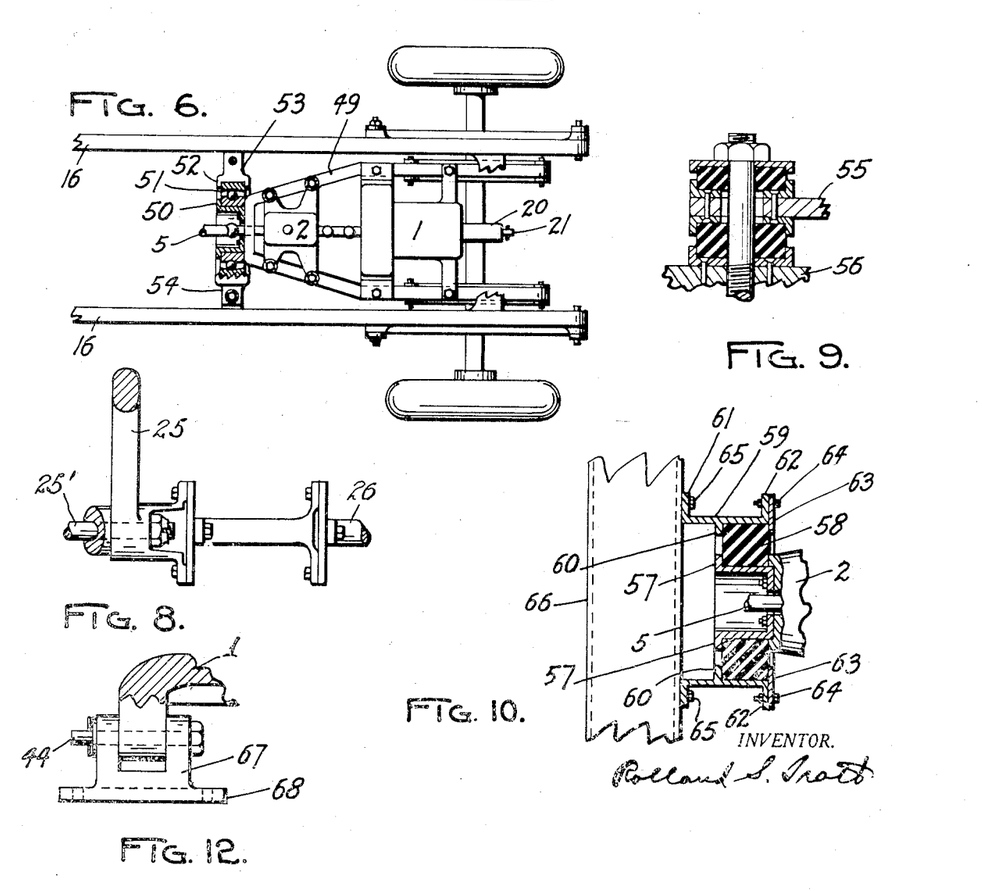
Figure 6 is a fragmentary plan view in which the engine and transmission are separated and are mounted upon a sub-frame, which sub-frame is mounted at the rear upon the frame of the vehicle by a universal ball bearing, and at the front is mounted upon semi-elliptic springs which are attached directly to the front axle.
Figure 8 is a detail of one form of the clutch pedal and clutch shaft construction.
Figure 9 is a detail showing a modified form of spring or power plant rubber mounting.
Figure 10 is a detail showing a modified form of mounting of the power plant on the frame.
Figure 12 is a detail of the rear pivot mounting of Figure 4.
Figure 7:
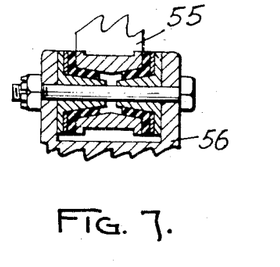
Figure 7 is a detail showing a rubber mounting construction, to be used and adapted for mounting the power plant or any part thereof on either frame or axle.

And the cushion supplied by the members 15 permits slight distortions of the power plant with respect to the frame without strain, noise, or shock, and will tend to absorb any vibration due to lack of perfection in the construction of the power plant. The front end of the power plant is supported on the cross spring 17, which is mounted on the front axle 18 in any proper manner, either through shackles 17' as shown, or through rubber or other cushioning means, forms of which are illustrated in Figures 7 and 9, but the connection is such as to allow transverse movement from side to side of the front of the engine unit while moving up and down by the flexing of the spring 17, both movements being caused as a result of the impulses incident to the operation of the engine and jointly acting to give the front of the engine unit restrained freedom of movement through an orbital path.

When the engine is in operation, the engine tremor caused as a result of the impulses incident to such operation of the engine unit causes torque cushioning oscillation of the engine unit about a longitudinal axis but the front end portion of the engine unit is permitted to have restrained freedom of movement in different directions at least resembling an orbit, whereas the back end portion of the engine unit has less freedom of movement or is confined to a smaller degree of orbital movement than the front end. That causes the axis of oscillation to move approximately in a general conical path or a frusto-conical path with the base thereof either circular or oval or in a figure 8 or other closed path, and which paths of movement are comprehended by the term "orbital" as used herein. The mounting of the engine unit for such restrained freedom of movement causes the engine tremor which would otherwise be transmitted to the vehicle to be dissipated or minimized to a substantial degree.

By having the transmission fixed to the engine as a unit and the mounting located approximately at the outer end of the transmission or behind the fly wheel there is no substantial amount of over-hung weight on the mounting and whip action due to over-hung weight is eliminated or substantially reduced. The disposition of the back mounting behind the fly wheel takes advantage of the gyroscopic action of the fly wheel for reducing the engine vibration transmitted to the rear mounting. By having the rear mounting spaced further from the cylinders than the front mounting, the engine operating forces acting thereon are appreciably reduced. The mountings for the front and rear end portions of the engine unit are disposed on opposite sides of the center of percussion of the engine unit and are spaced longitudinally from the center of percussion.

The spring 17 is to be properly proportioned to its load, with respect to the springs 19 and their proportioning with respect to their load, so that when the vehicle encounters a road shock, the frame 16 and the power plant will flex their respective springs the same amount and there will be as little differential movement as possible between them. The starting crank bracket 20, which naturally is concentric with the crankshaft 21 of the engine, is surrounded by a normally inactive rubber cushion 22, supported in a housing 23 and properly attached to the front frame member 24, the rubber cushion being slightly spaced from the bracket 20. The clutch pedal 25 is mounted on a shaft 25', mounted on the frame 16, and is connected by a flexible torsion transmitting connection to the clutch shaft 26. This connection may be of any proper construction so long as it will permit the relative movement between the clutch pedal 25 and the clutch shaft 26 due to the relative movement between the frame 16 and the power plant, and still act to operate the clutch. The flexible joints in Figure 1 are shown more clearly in Figure 8. But the clutch shaft control is obviously not limited to this particular construction, since the clutch pedal may even be mounted directly on the clutch shaft 26, as is standard construction. This clutch operating construction is claimed in companion application Ser. No. 574,173, filed November 10, 1931.

The brake pedal 25" may be mounted on the shaft 26' as shown, or may be freely mounted on the clutch shaft 26 or on another shaft carried by the power plant, which is standard construction, whether the pedal operates a mechanical or hydraulic brake system.

Each explosion of the engine which tends to make it revolve about its crankshaft will be resiliently cushioned by the action of the spring 17, the slight pivotal movement of the power plant during this cushioning being permitted by the rollers 6, so that no torque effect will be transmitted to the frame 16. The engine unit will thus be supported at two longitudinally spaced points, the front point of support being on the spring 17, so as to permit pivotal movement of the unit of an approximately orbital nature in response to the impulses of the engine during operation and about an inclined axis extending approximately through the center of the rear mounting and through the top of the front spring 17, as represented generally by the line, X—X, in Fig. 2.

When road shocks are encountered, the spring 17 will act in unison with the frame springs 19, and if for any reason there is a tendency for the movement of the power plant to be different from that of the frame 16, the action of the normally inactive cushion 22, will limit such differential movement.

The lateral movement of the front portion of the unit is permitted by the action of the cushion members 15 of the rear mounting, and is taken care of by the flexible connection between the clutch shaft 26 and the clutch pedal 25.

It will be seen that though the power plant may be carried in part by the frame, the torque re-action upon the engine when it turns the propeller shaft is carried by the front axle directly, either entirely, or nearly so.

The longitudinal position of the rear power plant support may, of course, be changed as desired, but I prefer it to be aligned with the universal joint at the front end of the propeller shaft for the reason that such position permits both power plant and propeller shaft to move independently of each other. That is, the propeller shaft may move due to action of the rear springs of the vehicle, without affecting the power plant, and the power plant may move slightly, due to differential movement between the frame and the front of the power plant, without affecting the propeller shaft.

The vertical position of the rear power plant mounting, I prefer to be as shown in Figure 1, that is, concentric with the crankshaft, for the reason that the torque of the engine tends to rotate or oscillate the engine about its crankshaft as a center, and such concentric mounting will generally give better results.

Figures 3, 4:
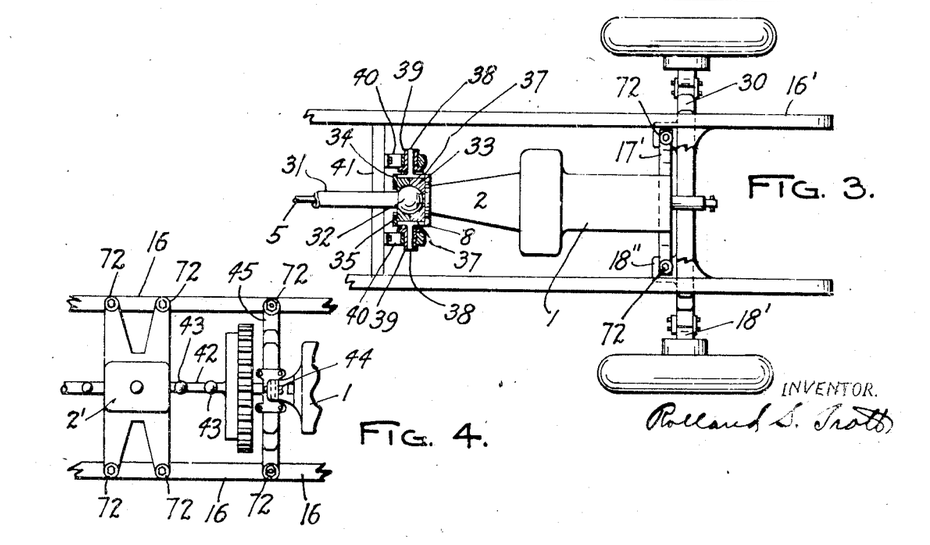
Figure 3 is a fragmentary plan view of a modified form in which the frame and the front of the unit power plant are mounted on the front axle by individual cross springs, the propeller shaft being enclosed, and the rear support being composed of a pivotally mounted pivotal bearing.
Figure 4 is a detail showing the transmission mounted on the frame and separate from the engine, the engine at the rear having a spring mounted pivotal support.

But, as shown in Figure 4, both the longitudinal and the vertical position of the rear support may vary, if desired, to better conform to the general construction of the power plant or engine in question.

Figures 11, 14:
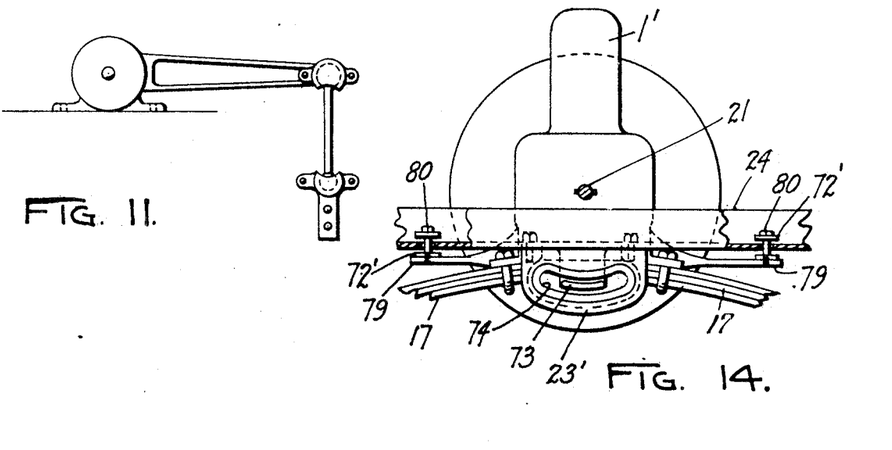
Figure 11 is a detail showing a spring control device adapted to be mounted between the power plant and the frame.
Figure 14 is a detail showing a modified form of normally inactive cushion construction.

The front end of the engine may be controlled by the normally inactive rubber cushion 22 shown in Figure 1, which is concentric with the engine crankshaft, or by the rubber cushion 74 shown in Figure 14, or by any other form or type of normally inactive bumper construction.

Instead of the starting crank bracket being concentric with the rubber cushion, or midway between the upper and the lower contact surfaces of the cushion, when the vehicle is unloaded, the parts may, if desired, be so proportioned that the starting crank bracket will bear some weight upon the rubber cushion when the vehicle is empty, whereby when the normal load is carried the frame will be lowered till the starting crank bracket is concentric with the rubber cushion.

The front end of the engine may also be controlled in its vertical movements by any of the well known devices for such purposes, attached to the engine and to the front axle; a similar device may be used to connect the frame and the front axle; and the two devices properly adjusted to give the frame and the engine the same movement with respect to the axle, and in that way control the differential movement between frame and engine.

And in place of, or in addition to, the normally inactive rubber cushion construction to control the differential movement between the engine and the frame, any proper spring control device may be used, with the device set or constructed to be normally inactive, if desired.

Figure 2:
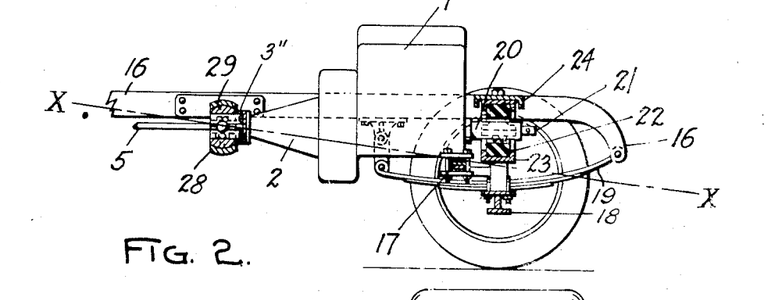
Figure 2 is a side view and partial section of the same but showing a rear power plant support composed of a plain globular bearing.

In the construction shown in Figure 2, the mounting bracket 3″ carries the inner member of a ball and socket mounting bearing.

The outer member of this joint is composed of a cross piece 28 the ends of which are secured to the frame 16, and a cap 29, which is properly secured to the piece 28.

This construction is cheaper and simpler than that shown in Figure 1, but provides the same action, except for the lack of cushion and the additional friction of the plain surfaces.

In the construction shown in Figure 3, the front of the power plant is mounted on the front axle 18′ by the cross spring 17′, and the frame 16′ is mounted on the front axle by the cross spring 30.

A cushion mounting 72 similar to that shown in Figure 9 is illustrated for connecting each end of the spring 17′ to the axle 18′ through the mounting plate 18″.

The propeller shaft 5 is enclosed in a torque tube 31, which has a ball 32 adapted to fit inside the ball housing of the power plant composed of the ball bracket 33 and the ball cap 34, held together by the cap screws 35, which engage the plate 8 of the transmission 2.

The support yoke 37 is divided into two halves through the center of the support pins 38, the flanged bushings 39 acting to hold the two halves together about the ball housing.

The frame brackets 40 on the cross frame member 41 journal the flanged bushings 39 and the support yoke 37 and support the rear end of the power plant.

In the construction shown in Figure 4, the transmission 2′ is mounted directly upon the frame 16, seperate from the engine 1.

The engine 1 is connected to drive the transmission through the shaft 42, which is provided with two universal joints 43.

The engine 1 is supported at the rear upon the trunnion pin 44, shown in Fig. 12, which is located directly under the crankshaft, and is mounted upon the cross spring 45, which is in turn mounted upon the frame by the rubber mountings 72.

Figures 13, 15, 16:
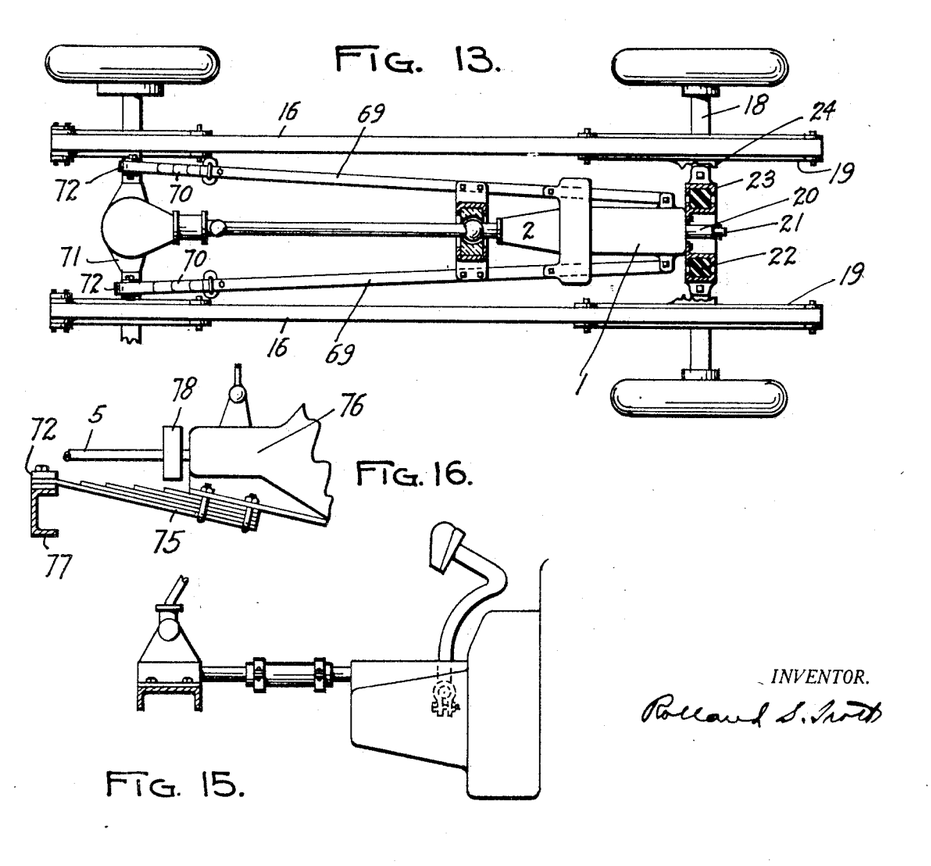
Figure 13 is a plan view of a modified form of power plant mounting.
Figure 15 is a detail showing a modified form of mounting for the pedals and the gear shift lever.
Figure 16 is a detail showing a modified form of the mounting of the power plant on the frame.

If desired a rubber mounting, two forms of which are shown in Figures 7 and 9, may be used in place of the trunnion pin construction, and a cross frame member such as shown at 77 in Figure 16 may be used in place of the spring 45.

These constructions, while I do not consider them as perfect in some ways as those having mountings concentric with the crankshaft, will with proper design, come quite close to giving the same results as obtained by the other constructions, since the effect of the lack of concentricity of the mounting may be to some extent taken up by the flexibility of the spring 45 or of the rubber mounting, or by other factors in the vehicle.

The mounting of the transmission directly upon the frame, while it will eliminate the relative movement of the frame and the gear shift lever, will not tend to reduce gear noises in low and intermediate gears. For this reason I have shown the transmission mounted on the frame by the rubber mountings 72 in Fig. 4. This construction is claimed specifically in a companion application Ser. No. 574,175, filed November 10, 1931.

Figure 5:
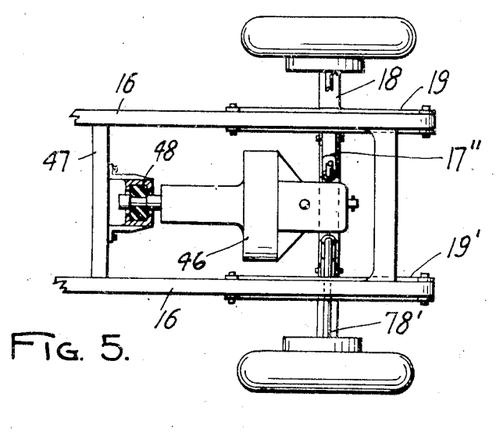
Figure 5 is a fragmentary plan view of a front wheel drive vehicle, having a rubber pivotal mounting at the rear.

In the construction shown in Figure 5, the engine unit 46, which in this case is composed of engine, transmission and differential, is mounted directly upon the front axle 18, by the cross spring 17″, and at the rear is mounted upon the cross frame member 47 by the flange retained rubber cushion 48, which is located as close as practical to concentric with the crankshaft, so as to give the effect of a mounting concentric with the crankshaft, as mentioned above.

The cushion member 48 provides all the results obtained by the other constructions shown, and may, in fact, be used in place of any of them if desired. Or any other proper construction for mounting the rear of the unit 46 may be used if desired.

In Figure 6, the construction in effect is the same as in the unit power plant construction, since the engine 1 and transmission 2 are mounted upon the sub-frame 49 and with it form a unit power plant which may be mounted at both ends by any of the various other constructions shown as well as by the construction shown in Figure 6.

The mounting bracket 50 mounts the inner track of the standard type of universal ball bearing 51, the outer track of which is mounted in the retainer 52, formed in the cross frame member 53; the bearing 51 being held in place by the cap 54, which is properly secured to the member 53.

Figure 7 shows one form of rubber mounting, which may be used between the frame and the rear cross member which supports the rear of the power plant, or between the engine and the front supporting spring, or between the engine spring or springs and the front axle, or the frame springs and the frame, or between the frame springs and the front axle, all depending upon the particular constructions employed and the judgment of the designer.

Figure 8 shows one form of double universal and shaft connection between the clutch pedal and the clutch shaft, adapted to operate the clutch and permit relative movement of the power plant and the frame without transmitting the vibration of the power plant to the frame.

Figure 9 shows another form of rubber mounting, to be used in the same manner as the form shown in Figure 7. The parts to be connected by this mounting are represented by the members 55 and 56.

In Figure 10, the bracket 57 is centered on the power plant, which acts to position the rubber cushion 58 on the bracket 57. The support 59 is provided with the flanges 60, 61, and 62. The plate 63, attached to the flange 62 by the bolts 64, positions the cushion 58 in the support 59 and against the flange 60. The bolts 65 through the flange 61, attach the support 59 to the frame cross member 66.

The cushion 58 provides a resilient mounting for the power plant, which not only cushions against horizontal or vertical shocks, but also permits the slight rotary movement of the power plant due to the resilient cushioning of the torque re-action as explained elsewhere.

The spring control device indicated in Figure 11, may be of any of the well known and proper types, frictional, hydraulic, pneumatic, or any combination of them. A device preferably with a free central movement may be used at any proper place to connect the power plant and the frame and permit free movement between them for as much as is required to cushion the torque re-action, but adapted to limit the differential movement after it has passed the amount necessary for such cushioning.

In Figure 12, the bracket 67 is to be mounted by its flange 68, upon the cross spring 45, shown in Figure 4, and properly attached thereto; the movement due to cushioning the torque re-action being permitted by the pin 44.

In Figure 13, the arrangement shown in Figure 1, is reversed, the pivotal cushion mounting being at the front end of the power plant, and the normally inactive cushion mounting being at the rear thereof; the rear of the power plant is mounted on the rear axle by the mounting members 69, which are provided with the springs 70, and which springs are mounted on the rear axle 71, by the cushion mounting 72, of any desired type or form.

While this construction is exactly the same in effect as that shown in Figure 1, I do not prefer it for the reason that the spring action of the rear axle is much greater than it is with the front axle of automotive vehicles generally, which makes it much more difficult to prevent over-use of the normally inactive cushion mounting or of the control devices; because the members 69 are also required to bridge the distance to the rear axle; and because in the construction shown in Figure 1, the end of the power plant nearest the pedals is the one with the least movement with respect to the frame, and hence there is less movement upon the gear shift lever, and upon the connection for the clutch pedal.

In Figure 14 is shown a modified form of normally inactive rubber cushion, which is spaced from the crankshaft instead of being concentric therewith. The angular movement incident to the cushioning of the torque reaction is permitted by the clearance at either end of the bracket 73 with the rubber cushion 74. I do not prefer this construction, but it may be used where it fits into a design better than the concentric construction. The bracket 73 is an extension from the engine 1, either integral therewith or attached thereto. The housing 23' is properly attached to the frame cross member 24 and carries the rubber cushion 74. This eccentric, normally inactive cushion construction permits the torsional cushion action of the engine, while still limiting its vertical movement with respect to the frame.

The bracket 79, not only provides for the attachment of the spring 17 to the engine 1, but also carries the cushion members 72' which co-operate with the lower horizontal web of the frame cross member 24.

These cushion members 72' are similar to the construction shown in Figure 9, except for the fact that the longer bolt 80 provides a normally inactive cushion which is capable of adjustment for the amount of free movement it permits.

The bracket 79 and the lower horizontal web of the cross member 24 are represented by the members 56 and 55 of Figure 9. The bracket 79 and the cushion members 72' act to resiliently limit the amount of torsional cushioning movement of the engine 1'. The free movement of the cushion members should be adjusted so that the ordinary torsional cushioning action of the engine is permitted. Thus, the bracket 73 limits the vertical and the bracket 79 limits the torsional movements of the engine with respect to the frame.

In production, these brackets may be made integral or separate as desired, so long as they are properly adapted to perform their functions and act to maintain the engine within reasonable limits of its normal position. But in any case, I prefer some limiting bumper or control means in connection with the torsional cushioning movement of the engine as well as its vertical movement.

In Figure 16, the transmission 76 is provided with a bracket to which is properly secured the spring 75, which passes under the propeller shaft brake and universal joint 78 and is carried upon the frame cross member 77 by the cushion mounting 72. I consider this a very good mounting when the balance of the construction is such as to permit the additional movement due to the spring 75. If desired a rubber counting may be properly attached to the bracket of the transmission 76 or by other proper construction, and supported by proper mounting on the cross frame member 77. This will eliminate the spring 75 in case its elimination is required.

Throttle and spark control constructions are not shown in this application, but it is understood that they as well as all other controls and connections should be such as to be substantially unaffected by the differential movement of the frame and the engine unit.

I am well aware that the gear shift lever may be mounted on a cross member of the frame, and connected by shock cushioning connections to operate the transmission in its various positions, as indicated in Figure 15, so that none of the movement due to the torque re-action cushioning will be transmitted to the gear shift lever. This is claimed in a companion application Ser. No. 578,109 filed November 30, 1931. I am also aware that the clutch pedal may if desired be mounted directly upon the engine unit, or power plant, as is standard practice, and as indicated in Figure 15, and with a thick pad of soft rubber or sponge rubber properly attached to the foot pad to cushion the sensation on the driver's foot. Any of the connections or mountings may be cushioned in various ways, obviously; and any combination of the various elements, forms and types of construction may be used if desired.

I am also aware that under some conditions it may be advantageous to position the pivotal mounting or mountings of the engine unit to one side of the center of weight, so as to tend to oppose the torque reaction of the engine unit by off-center weight in its mountings; or the off-center weight may be such as to operate against the springs in the same direction as the torque re-action acts upon the engine, so as to give the springs which resiliently oppose the torque re-action an initial load similar to that imposed by the torque re-action.

But, in any case, I consider all such variations and changes to be but mechanical equivalents whereby the engine unit is mounted partially upon the frame and partially directly upon the axle, so as to transmit no torque re-action whatever to the frame but to transmit all torque re-action to the axle direct.

It is, of course, understood that the automotive vehicle is to be provided with generator, starter, ignition and cooling equipment, as well as gasolene tank and connections, steering gear mounted on the frame and connections, throttle and spark controls adapted to be unaffected by the relative movement of the engine unit with respect to the frame, battery and connections, muffler mounted on the engine, or on the frame and provided with a flexible exhaust pipe or connections, brake equipment and control, instruments and connections, hood, body, running board, pans, radiator and connections and in fact with all the usual appointments as well as those especially required by my invention and its combination with the rest of the vehicle.

But, the greater part of all the above elements are omitted from the drawings for the sake of clearness.

I have used the terms "orbital", "gyratory" or "wabble" more or less as synonyms to designate the character of the restrained freedom of movement of the engine unit in the vehicle which is an opposed oscillatory movement about the longitudinal axis and at the same time a restrained freedom of movement at least at the front end in approximately any direction generally in a closed path but with relatively less movement at the back end than at the front so that one end of the engine unit is movable bodily relative to the vehicle proper.

Of course the degree and particular path of this movement varies in accordance with variations in the engine actuated impulses which are the direct cause of such movement. While the terms selected to designate this movement may not under all conditions of the engine unit be absolutely precise and fully describe the movements of the engine in the light of the accepted meaning of these terms, nevertheless it will be appreciated that these terms should be interpreted in accordance with my intention and in accordance with the operation of the engine unit when mounted according to my invention.

It is intended that the terms "tremor" "vibration" "reaction" and the like as used in the claims are to be considered synonymous. That is to say, these terms are employed to designate the forces of the power or engine unit which it is the aim of this invention to substantially dissipate so that there will be a minimum amount of such forces transmitted from the power unit to the remainder of the vehicle.

Therefore, I do not wish to confine my protection narrowly to the exact constructions described and illustrated, but what I claim as new and desire to protect by Letters Patent, is as follows:—

1. In an automotive vehicle including axles, springs, frame and engine unit, means connecting said unit to the frame and permitting universal pivoting movement thereon, and resilient means not including the frame connecting the engine unit to one of the axles and adapted to resiliently maintain the position of the engine unit against the torque reaction.

2. In an automotive vehicle including axles, springs, frame and engine unit in driving connection with the driving axle of the vehicle, a mounting adapted to carry part of the weight of the engine unit and supported upon the frame and permitting universal pivotal movement of the engine unit with respect to the frame, and resilient means adapted to carry a part of the weight of the engine unit and connected to one of the axles of the vehicle and adapted to resiliently maintain the position of the engine unit with respect to the frame against transverse torque reaction.

3. In an automotive vehicle, including axles, springs, and frame, an engine unit, resilient means mounting the engine unit directly upon one of the axles of the vehicle and adapted to carry part of the weight of the engine unit and resiliently position the engine unit against transverse torque re-action, and means spaced from the first means and mounting the engine unit upon the frame and permitting universal pivotal movement of the engine unit with respect to the frame.

4. In an automotive vehicle, including axles, springs, and frame, an engine unit, resilient means connecting the engine unit directly to one of the axles of the vehicle and adapted to resiliently transmit the torque reaction of the engine unit directly to the axle, and means connecting the engine unit to the frame and permitting substantially free universal pivoting movement therewith.

5. In an automotive vehicle, an engine unit adapted to have movement with respect to the frame of a vehicle for the purpose of cushioning the torque reaction of the engine unit, and mounted upon the frame at one point, and at a second point spaced from the first point resiliently mounted by a mounting upon one of the axles of the vehicle, said mounting being constructed and arranged to resiliently transmit to the said axle the torque reaction of the engine unit said mounting including non-metallic means.

6. In an automotive vehicle including axles, springs, frame and engine unit, means connecting the engine unit to the frame substantially incapable of transmitting engine torque from the engine unit to the frame, and resilient means forming the sole connection between the engine unit and one of the axles and adapted to resiliently transmit substantially the entire engine torque reaction of the engine unit to the said axle.

7. In an automotive vehicle including axles, springs, frame and engine unit, a transversely extending spring, means mounting said spring upon one of the axles, means mounting the engine unit upon said spring, and means mounting the engine unit upon the frame and permitting substantially universal movement.

8. In a motor vehicle having an engine unit and axle means, mounting means for the engine unit resiliently mounting same upon one of the axle means and permitting a slightly opposed bodily transverse movement with respect to said axle means, and means spaced from the first means for mounting the engine unit on the frame and permitting universal movement thereof.

9. In an automotive vehicle having axle means, wheels, a frame sprung on the axle means, an engine unit independently sprung upon the axle means at one end of the frame to permit vertical and a slight bodily transverse movement and having a movable support upon the frame intermediate its ends including compressible means whereby the center of mass of the frame and the center of mass of the engine unit have different moment arms.

10. In an automotive vehicle including axles, springs, frame and engine unit in driving connection with the driving axle of the vehicle, a mounting adapted to carry part of the weight of the engine unit and supported upon the frame adjacent one end of said unit and permitting substantially universal pivotal movement of the engine unit with respect to the frame, mounting means provided with compressible material at the other end of the unit and mounted upon the frame, and resilient means connected to one of the axles of the vehicle and adapted to resiliently maintain the position of the engine unit with respect to the frame against engine unit torque reaction.

11. In the mounting of the engine unit of a motor vehicle having axles, springs mounted on the axles, a frame mounted on the springs, means mounting the engine unit on the vehicle including a mounting for an end of the engine unit on the frame and permitting a transverse torque cushioning movement of the engine unit with respect to the frame, and axle aligning means connected with an axle and having a torsional resilient reaction absorbing connection with the engine unit.

12. In the mounting of the engine unit of a motor vehicle having axles, springs mounted on the axles, a frame mounted on the springs, cushion means mounting the engine unit upon the vehicle including a mounting for an end of the engine unit on the frame and providing substantial pivotal movement of the engine unit with respect to the frame for the purpose of cushioning the torque reaction of the engine unit without transmitting the same to the frame, and means forming a torsional resilient axle aligning connection between the engine unit and one of the axles.

13. In an automotive vehicle, the combination of a frame, an engine unit having a non-metallic yieldable mounting at its rear on the frame of the vehicle, and means forming a resilient connection between the engine unit and the front axle of the vehicle and including non-metallic means adapted to resiliently transmit to the front axle approximately all of the torque reaction of the engine unit.

14. In an automotive vehicle, having wheel and axle means, and a frame mounted thereon, the combination of an engine unit, means mounting an end portion of the engine unit on the frame for approximately pivotal movement about an axis extending longitudinally of the engine unit, and transversely disposed resilient means mounting the other end portion of the engine unit and supported by the wheel and axle means and providing resiliently opposed substantially pivotal movement of the engine unit.

15. In an automotive vehicle, having wheel and axle means and a frame mounted thereon, the combination of an engine unit, means mounting an end portion of the engine unit on the frame for approximately universal and pivotal movement, and resilient means carried by the wheel and axle means and mounting the other end portion of the engine unit, said last-mentioned means being constructed and arranged for pivotal and orbital movement of the engine unit in response to impulses of the engine unit incident to the operation thereof.

16. In an automotive vehicle, having wheel and axle means and a frame mounted thereon, the combination of an engine unit, means mounting an end portion of the engine unit on the frame for approximately universal and pivotal movement, and a transversely extending spring carried by the axle means and mounting the other end portion of the engine unit, said last-mentioned spring being constructed and arranged for pivotal and orbital movement of the engine unit in response to impulses of the engine unit during operation thereof.

17. In an automotive vehicle, having wheel and axle means, and a frame mounted thereon, the combination of an engine unit, mounting means carried by the frame and supporting an end portion of the engine unit, and secondary mounting means carried by the wheel and axle means, said first-mentioned and secondary mounting means being arranged at spaced points approximately in the longitudinal central vertical plane of the engine unit and supporting said engine unit for oscillatory and orbital movement about an inclined axis in response to impulses of the engine unit during operation.

18. In an automotive vehicle, the combination of an engine unit having inherent oscillation about a longitudinal axis, means mounting an end portion of the engine unit on the vehicle and permitting approximately universal movement of said engine unit while holding said end portion against substantial lateral movement, and resilient means mounting and supporting another portion of the engine unit spaced longitudinally from said first-mentioned portion on the vehicle and constructed and arranged to permit approximately orbital movement of the engine unit at least at that portion in response to the impulses incident to the operation of the engine unit.

19. In an automotive vehicle, the combination of an engine unit having inherent oscillation about a longitudinal axis, means mounting an end portion of the engine unit on the vehicle and permitting approximately universal movement of said engine unit while yieldingly holding said end portion against substantial lateral movement, and resilient means mounting and supporting the opposite end portion of the engine unit on the vehicle and constructed and arranged to permit approximately orbital movement of the engine unit at least at that end in response to the impulses incident to the operation of the engine unit.

20. In an automotive vehicle, the combination of an engine unit having inherent torque cushioning oscillation about a longitudinal axis, means mounting an end portion of the engine unit on the vehicle and permitting approximately universal movement of said end portion while holding said end portion against substantial lateral movement, and resilient means mounting and supporting the opposite end portion of the engine unit on the vehicle and constructed and arranged to permit orbital movement of the engine unit at least at that end in response to the impulses incident to the operation of the engine unit, said resilient mounting means permitting yieldingly opposed oscillation of the engine unit.

21. In an automotive vehicle, the combination of an engine unit having inherent oscillation about a longitudinal axis, means mounting an end portion of the engine unit on the vehicle and so constructed and arranged as to permit approximately universal movement of said unit and to prevent substantial lateral movement of said end portion, and resilient means mounting and supporting the other end portion of said engine unit on the vehicle and constructed and arranged to permit engine actuated wabble movement in any transverse direction of said last-mentioned end portion in response to the impulses incident to the operation of the engine unit.

22. In an automotive vehicle, the combination of an engine unit having inherent torque cushioning oscillation about a longitudinal axis, means mounting an end portion of the engine unit on the vehicle and so constructed and arranged as to permit approximately universal movement of said unit and to prevent substantial lateral movement of said end portion, and resilient means mounting and supporting the other end portion of said engine unit on the vehicle and constructed and arranged to permit engine actuated wabble movement in any transverse direction of said last-mentioned end portion in response to the impulses incident to the operation of the engine unit, said last-mentioned mounting means permitting yieldingly opposed oscillation of the engine unit.

23. In an automotive vehicle, the combination of an engine unit having inherent oscillation about a longitudinal axis, means mounting an end portion of the engine unit on the vehicle and so constructed and arranged as to permit swinging movement of said engine unit in any direction about said mounting as a fulcrum while holding said end portion against substantial bodily movement relative to the vehicle, and resilient means mounting and supporting the other end portion of said engine unit on the vehicle and constructed and arranged to permit gyration of said last-mentioned end portion about the fulcrum of the first-mentioned mounting means.

24. In an automotive vehicle, the combination of an engine unit having inherent torque cushioning oscillation about a longitudinal axis, means mounting an end portion of the engine unit on the vehicle and so constructed and arranged as to permit swinging movement of said engine unit in any direction about said mounting means as a fulcrum while yieldingly holding said end portion against substantial bodily movement relative to the vehicle, and resilient means mounting and supporting the other end portion of said engine unit on the vehicle and constructed and arranged to permit gyration of said last-mentioned end portion about the fulcrum of the first-mentioned mounting means, said last-mentioned mounting means permitting yieldingly opposed oscillation of said engine unit.

25. In a mounting for a multi-cylinder power unit in a vehicle to minimize tremor in the vehicle during operation, said power unit having engine cylinders and a transmission, a plurality of longitudinally spaced supporting structures carried by the vehicle and on which the power unit is carried for yieldingly opposed oscillation about a longitudinal axis, one of said supporting structures being resilient and constructed and arranged to permit and limit engine actuated orbital movement of the power unit about a fulcrum point remote from one end of the cylinders, and the other supporting structure being constructed and arranged to provide said fulcrum point relatively remote from said cylinders and to hold the corresponding end portion of the power unit relatively fixed against substantial bodily movement in any direction.

26. In a vehicle, a mounting for a multi-cylinder power unit to minimize tremor in the vehicle during operation, said power unit having engine cylinders and a transmission, a plurality of longitudinally spaced supporting structures carried by the vehicle and on which the power unit is carried for yieldingly opposed torque cushioning oscillation about a longitudinal axis, one of said supporting structures being resilient and constructed and arranged to permit and limit engine actuated orbital movement of the power unit about a fulcrum point remote from one end of the cylinders and another supporting structure being constructed and arranged to provide said fulcrum point relatively remote from said cylinders and to hold the corresponding end portion of the power unit relatively fixed against bodily movement in any direction whereby the amount of movement of the power unit progressively increases from the last-mentioned end portion to the first-mentioned end portion of the power unit.

27. In a mounting for a multi-cylinder engine unit on a vehicle to minimize tremor in the vehicle during operation, a plurality of longitudinally spaced supporting structures carried by the vehicle and on which the engine unit is carried for yieldingly opposed oscillation about a longitudinal axis, one of said supporting structures being resilient and constructed and arranged to permit and limit engine actuated orbital movement of the engine unit, and the other of said supporting structures being remotely spaced from the corresponding end of the cylinders and being constructed and arranged to provide a relatively fixed fulcrum point about which the cylinders move.

28. In an automotive vehicle, the combination of an engine unit including an engine and a change speed transmission attached rigidly together, resilient means mounting and supporting an end portion of the engine unit on the vehicle and constructed and arranged to permit transverse movement of the engine unit at that end portion in all directions from normal in response to impulses incident to the operation of the engine while the engine unit oscillates about a longitudinal axis, and means mounting the opposite end portion of the engine unit and permitting approximately universal movement thereof while holding said last-mentioned end portion of the engine unit relatively fixed against lateral movement, said last-mentioned mounting means being attached to the outer end of the transmission whereby whip action due to overhang is approximately eliminated.

29. In an automotive vehicle, the combination of an engine unit including an engine portion and a change speed transmission portion attached rigidly together, resilient means mounting and supporting an end portion of the engine unit on the vehicle and constructed and arranged to permit transverse movement of the engine unit at that end in all directions from normal in response to impulses incident to the operation of the engine while the engine unit has torque cushioning oscillation about a longitudinal axis, and means mounting the opposite end portion of the engine unit and permitting approximately universal movement thereof while holding said last-mentioned end portion of the engine unit relatively fixed against lateral movement, said last-mentioned mounting means being attached to the transmission adjacent the outer end thereof whereby whip action due to overhang is approximately eliminated, and said last-mentioned mounting means being more remote from the engine portion than the first-mentioned mounting means whereby the engine operating forces tending to produce bodily movement will be of smaller magnitude at the last-mentioned end than at the first-mentioned end of the engine unit.

30. A method of mounting an engine unit on a vehicle to minimize tremor in the vehicle during operation which comprises supporting an end portion of the engine unit on the vehicle permitting approximately universal movement of that end portion and holding it against any substantial bodily movement, and resiliently supporting the other end portion of the engine unit on the vehicle and permitting orbital movement thereof.

31. A method of mounting an engine unit on a vehicle to minimize tremor in the vehicle during operation which comprises supporting an end portion of the engine unit on the vehicle permitting approximately universal movement of that end portion and holding it against substantial bodily movement, and resiliently supporting the other end portion of the engine unit on the vehicle for closed orbital movement thereof and permitting yieldingly opposed torque cushioning oscillation of the engine unit.

32. A method of mounting an engine unit on a vehicle to minimize tremor in the vehicle during operation which comprises supporting an end portion of the engine unit on the vehicle and permitting approximately universal movement at that end portion and holding it against any substantial bodily movement, and resiliently supporting the other end portion of the engine unit on the vehicle and permitting orbital movement thereof while the engine unit oscillates about a longitudinal axis.

33. A method of mounting an engine unit on a vehicle to minimize tremor in the vehicle during operation which comprises supporting an end portion of the engine unit on the vehicle and permitting approximately universal movement at that end portion and holding it against substantial bodily movement, and resiliently supporting the other end portion of the engine unit on the vehicle and permitting orbital movement thereof while the engine unit has torque cushioning oscillation about a longitudinal axis.

34. A method of mounting an engine unit in a vehicle to minimize the transmission of vibration from the engine unit to the vehicle during operation, which engine unit has a tendency to oscillate about a longitudinal axis during operation, consisting in supporting an end portion of the engine unit on the vehicle for approximately universal movement and holding it against substantial bodily movement, and resiliently supporting the other end portion of the engine unit on the vehicle for gyratory movement about a relatively fixed center at the first mentioned point of support and located approximately on the longitudinal axis of oscillation.

35. A method of mounting an engine unit in a vehicle to minimize the transmission of vibration from the engine unit to the remainder of the vehicle during operation, which engine unit has a tendency to torque cushioning oscillation about a longitudinal axis during operation, consisting in supporting an end portion of the engine unit on the vehicle for approximately universal movement and holding it against substantial bodily movement and resiliently supporting the other end portion of the engine unit on the vehicle for gyratory movement about a relatively fixed center adjacent the first-mentioned point of support and located approximately on the longitudinal axis of oscillation and providing yieldingly opposed oscillation of the engine unit.

36. In a vehicle engine unit mounting, the method of minimizing transmission of engine tremor to the vehicle body which comprises providing a support for one end of the unit which serves to provide a fulcrum point for said end of the unit and which restrains substantial movement of said end, and providing another support longitudinally spaced from said first support to resiliently support the unit on the vehicle for a substantial degree of movement of the other end of the unit relatively to said fulcrum point thereby enabling engine actuated impulses to orbitally move said unit and during such movement causing engine tremor to be substantially dissipated.

37. The method of minimizing the transmission of the reactionary forces of a power unit to a vehicle, said power unit including an engine and a transmission which method includes providing a plurality of supports spaced longitudinally from opposite sides of the center of percussion of the power unit for supporting the unit on the vehicle, making provision in one of said supports for pivotal movement of the unit with respect thereto and for restraining substantial bodily movement of the portion of the unit carried thereby, and in the other support resiliently supporting the unit to permit the unit to oscillate about its axis of oscillation and at the same time permitting a controlled amount of orbital motion between the portion of the power unit carried by said last-mentioned support and the vehicle so that the unit reactionary forces may be substantially dissipated in orbitally moving said last-mentioned power unit portion.

In testimony whereof I affix my signature.

ROLLAND S. TROTT.